Aug. 23, 1966  L. H. MENKEE ET AL  3,268,081
WATER SKIMMER BOAT
Filed Jan. 8, 1964  2 Sheets-Sheet 1
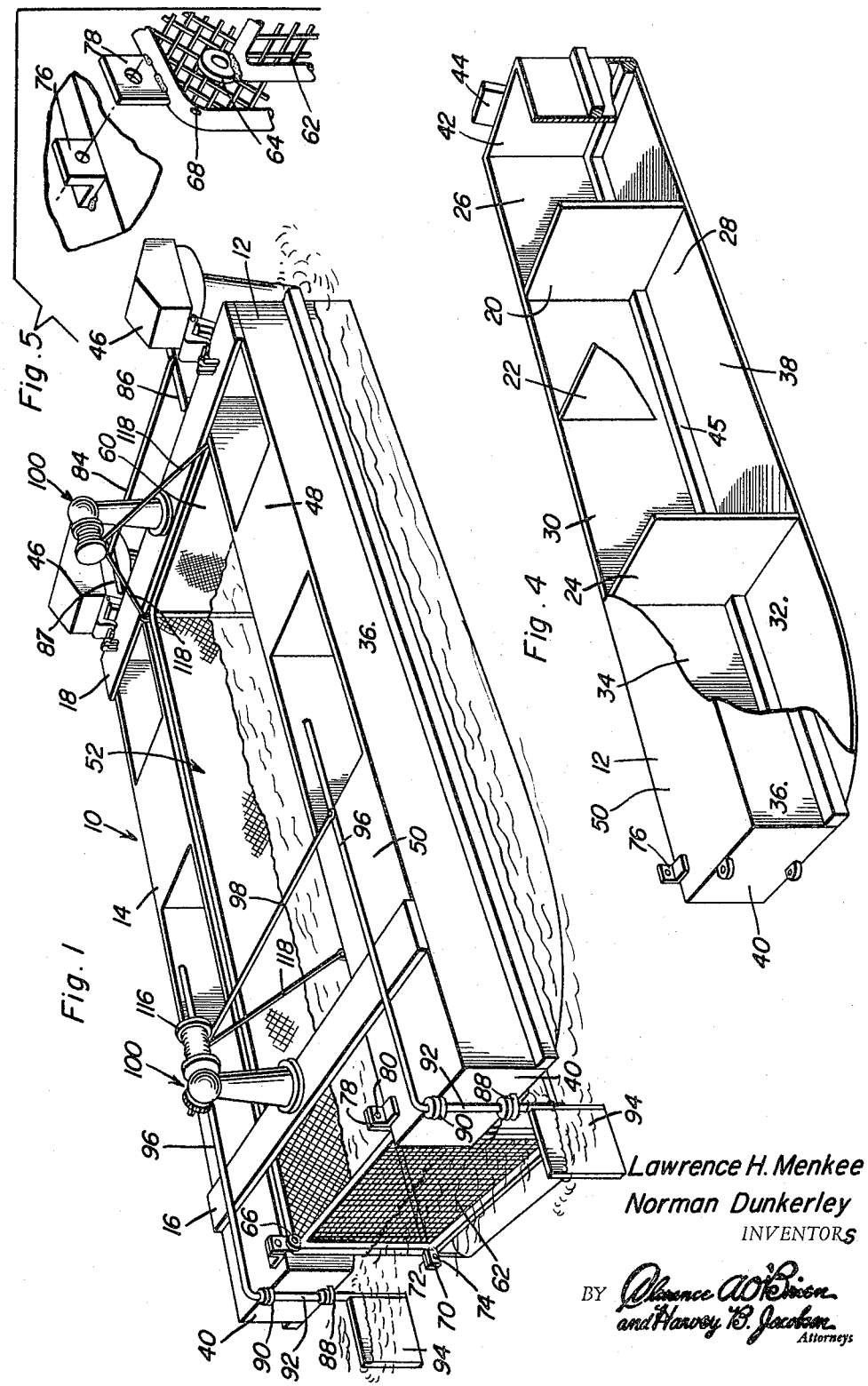
Lawrence H. Menkee
Norman Dunkerley
INVENTORS
BY Clarence A. O'Brien
and Harvey B. Jacobson
Attorneys

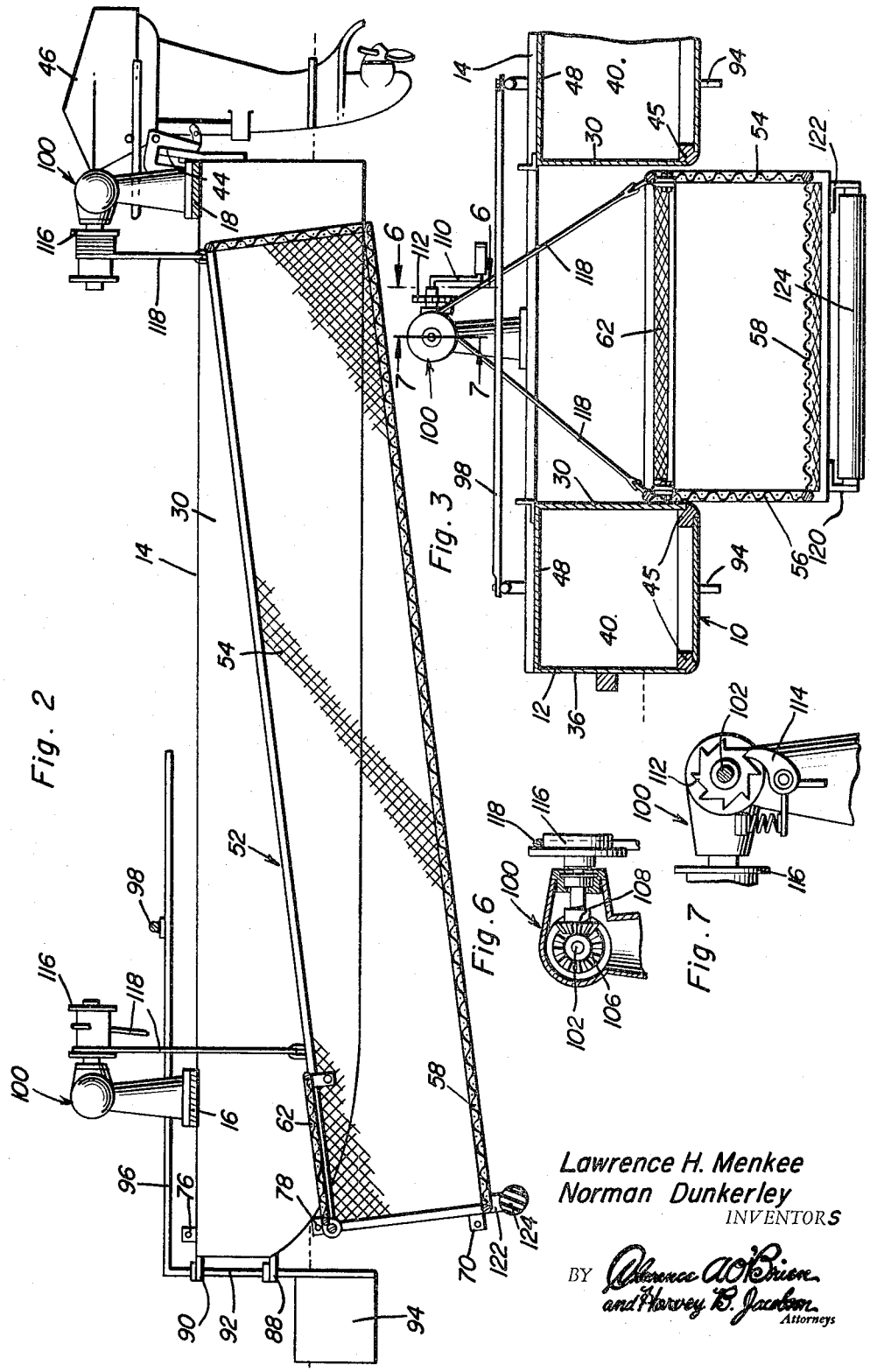

3,268,081
WATER SKIMMER BOAT
Lawrence H. Menkee, Manhattan Beach, Calif., and Norman Dunkerley, P.O. Box 472, Avalon, Calif.; said Menkee assignor of one-sixth to said Dunkerley
Filed Jan. 8, 1964, Ser. No. 336,401
11 Claims. (Cl. 210—242)

This invention relates to a novel and useful water skimmer boat and more specifically to a watercraft designed primarily for clearing harbors and boat mooring areas of floating debris such as kelp and various types of trash.

The water skimmer boat of the instant invention includes a pair of generally parallel elongated hull members which are interconnected by means of transverse brace members and have an elongated channel-shaped scoop extending longitudinally of said boat therebetween. The channel-shaped scoop includes a rear end wall which closes the rear end of the scoop and the entire scoop is foraminated with the rear end thereof being pivotally supported between the hull members for rotation about a generally horizontally disposed axis extending transversely of the boat. Means is provided for raising and lowering the forward end of the scoop and in this manner both floating and semi-floating debris may be scooped from the water as the skimmer boat moves through the water.

The skimmer boat is adapted to be powered either by a pair of outboard motors disposed on the aft ends of the hull members or by inboard engines disposed within the hull members and coacting with conventional rudders provided on the aft portions of the hull members. In addition, the forward end of each hull member is also provided with a rudder and the forward rudders are interconnected for equal and simultaneous pivoting movement. Of course, the aft rudders are also interconnected for simultaneous operation and the controls for the forward and aft rudders may be individually actuated. In this manner, the water skimmer boat is rendered extremely maneuverable and may even be made to move in an oblique direction.

The elongated channel-shaped scoop is also provided with an upstanding front end wall which is pivotally secured between the side walls of the scoop for movement about a generally horizontally disposed axis extending transversely of the forward end of the scoop and along the upper marginal edge portion of the front end wall whereby the front end wall may be pivoted from an inoperative substantially horizontally disposed position to an operative upright position closing the forward end of the scoop. In the latter position the scoop may be utilized to transport stock fish from one location to another or as a means for transporting substantially any type of live marine life which is capable of being received within the scoop.

The job of cleaning harbors and boat mooring areas has heretofore been carried out by crews of men provided with pitch forks and/or rakes disposed in rowboats or the like. This type of manual operation is, of course, very slow and inadequate for most areas.

Accordingly, it is the main object of this invention to provide a water skimmer boat which will be capable of efficiently and rapidly clearing harbors and boat mooring areas of floating debris such as kelp and various types of trash.

Another object of this invention, in accordance with the preceding object, is to provide a water skimmer boat provided with improved steering means whereby the maneuverability of the boat will be greatly increased thereby enabling it to maneuver in close quarters.

Still another object of this invention is to provide a water skimmer boat in accordance with the preceding objects that will be readily adaptable to manufacture in various sizes.

Yet another object of this invention is to provide a water skimmer boat which will be particularly well adapted to be powered by both inboard and outboard motors.

Another object of this invention is to provide a water skimmer boat in accordance with the preceding objects and including navigational controls and structural features that will enable the water skimmer boat to be readily handled by a minimum crew.

A final object of this invention to be specifically enumerated herein is to provide a water skimmer boat constructed in accordance with the preceding objects which will conform to conventional forms of manufacture, be of simple construction and easy to operate so as to provide a device that will be economically feasible, long lasting and relatively troublefree in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the water skimmer boat of the instant invention;

FIGURE 2 is a longitudinal vertical sectional view on somewhat of an enlarged scale and taken substantially upon a plane passing through the longitudinal centerline of the water skimmer boat;

FIGURE 3 is a fragmentary transverse vertical sectional view taken substantially upon a plane passing through the water skimmer boat at the forward end of the water scoop defined thereby;

FIGURE 4 is a perspective view of one of the hull members of the water skimmer boat with portions thereof being broken away and shown in section;

FIGURE 5 is a fragmentary exploded perspective view showing the structural details of the manner in which the forward end of the scoop may be removably secured in a raised position and also the manner in which the front end wall of the scoop is pivotally supported between the forward ends of the sides of the scoop;

FIGURE 6 is a fragmentary enlarged longitudinal vertical sectional view taken substantially upon the plane indicated by the section line 6—6 of FIGURE 3; and FIGURE 7 is a fragmentary longitudinal vertical sectional view on somewhat of an elongated scale taken substantially upon the plane indicated by the section line 7—7 of FIGURE 3.

Referring now more specifically to the drawings the numeral 10 generally designates the water skimmer boat of the instant invention which includes a pair of generally parallel elongated hull members 12 and 14 interconnected by means of front and rear transverse brace members 16 and 18. Each of the hull members 12 and 14 is substantially rectangular in cross-section and includes three internal baffle walls or partitions 20, 22 and 24 dividing the inside of the hull members into a rear well 26, an air-tight compartment 28, a front well 30, and a front air-tight compartment 32.

Each of the hull members includes a pair of side walls 34 and 36 interconnected at their lower ends by means of a bottom wall 38, at their forward ends by means of a front wall 40, and at their rear ends by means of a transom 42. Each of the transoms 42 includes an outboard motor mounting bracket 44 to which the corresponding outboard motor 46 may be secured in a conventional manner.

A pair of longitudinal chine members 45 which are rabbeted to receive the longitudinal edge portions of the bottom wall 38 and the side walls 34 and 36, are utilized to secure the side walls 34 and 36 to the bottom wall 38. A first partial top wall or deck 48 is used to close the upper end of the rear airtight compartment 28 and a second partial top wall or deck 50 is utilized to close each of the forward airtight compartments 32.

An elongated and longitudinally extending scoop generally referred to by the reference numeral 52 is provided and includes a pair of upstanding opposite side walls 54 and 56 interconnected at their lower ends by means of a bottom wall 58. In addition, an upstanding rear wall 60 is secured between the rear edges of the bottom walls 58 and the opposite side walls 54 and 56 while a front wall 62 including a pair of apertured mounting ears 64 is pivotally secured between the upper forward corners of the opposite side walls 54 and 56 by means of suitable fasteners 66 secured through the ears 64 and the transverse bores 68 provided therefor in the forward upper corners of the opposite side walls 54 and 56. In this manner, it may be seen that the front wall 62 may be pivoted between the upstanding position illustrated in FIGURE 1 of the drawings and the horizontally disposed position illustrated in FIGURE 2 of the drawings, the opposite ends of the lower marginal edge portion of the front wall 62 being provided with apertured ears 70 which are registrable with corresponding apertured ears 72 carried by the forward lower corners of the opposite side walls 54 and 56 for the purpose of securing the front wall 62 in the lowered upstanding position illustrated in FIGURE 1 of the drawings by means of suitable fasteners 74 secured through the corresponding apertured ears 70 and 72. Still further, each of the hull members 12 and 14 includes an upstanding apertured flange 76 on its forward end with which the corresponding apertured ear 78 carried by the corresponding side wall of the scoop 52 may be registered for securing the forward end of the scoop 52 in the elevated position illustrated in FIGURE 1 of the drawings by means of any suitable fastener 80 secured through the registered ears and flanges 76 and 78.

The outboard motors 46 may be replaced by inboard engines supported within the hull members and it is to be noted that in the event inboard engines are utilized suitable rudder means will be required for each hull member 12 and 14 in lieu of the outboard motor 46 secured thereto, the rear rudder assemblies proposed in lieu of the outboard motor 46 being interconnected for simultaneous operation in any convenient manner similar to the connecting rod 84 pivotally secured at its opposite ends to the steering arms 86 and 87 of the outboard motors 46.

Each of the hull members 12 and 14 includes a pair of aligned journals 88 and 90 on its front wall 40 which rotatably journal a corresponding rudder shaft 92 having a rudder member 94 mounted on the lower end thereof. The upper ends of the rudder shafts 92 include rearwardly directed horizontally disposed upper end portions 96 which are interconnected at their rear end portions by means of a transversely extending connecting rod 98 pivotally secured at its opposite ends to the corresponding upper end portions 96.

A pair of substantially identical winch assemblies generally referred to by the reference numerals 100 are supported from the transverse brace members 16 and 18 between the hull members 12 and 14 and each includes an input shaft 102 which is drivingly connected to a winding drum shaft 104 by means of suitable meshed gears 106 and 108 mounted on the shafts 102 and 104, respectively. One end of each input shaft 102 has a crank 110 operatively connected thereto and a ratchet wheel 112 mounted thereon with which a spring urged and pivotally mounted ratchet pawl 114 is engageable. Each of the winding drum shafts 104 has a winding drum 116 mounted thereon for rotation therewith and each winding drum 116 has a pair of pull members 118 wound thereon with the free ends of the pull members 118 of each winding drum being secured to the upper edge portions of the opposite side walls 54 and 56 at the corresponding end of the scoop 52.

In operation, the forward rudder members or elements 94 may be operated from either of the wells 30 by one person and the outboard motors 46 may be operated from either of the wells 26 by a second person. In addition, any suitable means may be utilized to extend the steering controls of either the rudder members 94 or the outboard motors 46 in order that a single person may actuate both controls from one of the wells 26 and 30. Still further, the upper end portions 96 and the steering arms 86 and 87 may be operatively connected to any suitable conventional steering wheel means for actuation thereby if desired. In addition, the winch assemblies 100 may be power operated and the fasteners 74 and 80 may also be of the quick releasable type and provided with suitable actuating means which may be remotely actuated.

In operation, the scoop 52 of the water skimmer boat 10 may be lowered at its forward end with the front wall 62 pivoted to the horizontal position illustrated in FIGURE 2 of the drawings. With the forward end of the scoop 52 lowered in this manner the scoop may be utilized to pick up floating debris and the like from harbors and boat mooring areas. Inasmuch as the bottom wall 58, the opposite side walls 54 and 56, and the front and rear walls 62 and 60 are foraminated, only the trash which is scooped from the water will be retained within the scoop, the water through which the scoop 52 passes readily passing through the various foraminated walls of the scoop 52. If it is desired, the rear winch assembly 100 may be actuated to lower the rear end of the scoop 52 and in addition, the front wall 62 of the scoop 52 may be lowered and secured in the lowered position whereby the scoop 52 may be utilized to transport living marine life from one location to another.

The provision of the outboard motors 46 on the rear ends of the hull members 12 and 14, the outboard motors 46 comprising steering means, and the rudder members 94 on the forward ends of the hull members 12 and 14 enable the water skimmer boat 10 to be maneuvered with little effort in confined areas. In addition to the forward rudder members or elements 94 greatly assisting in turning the water skimmer boat 10, the forward rudder members 94 will also enable the water skimmer boat to move in an oblique direction.

With attention now invited to FIGURE 2 of the drawings it may be seen that the forward end of the bottom wall 58 of the scoop 52 is provided with a pair of depending journal supports 120 and 122 between which a transversely extending and generally horizontally disposed roller 124 is journaled. The roller 124 is provided to assist the forward end of the scoop 52 in clearing submerged objects when the water skimmer boat 10 is operating in shallow water. Still further, although the water skimmer boat 10 is designed primarily for slow speed operation, it will be seen that the forward end of the bottom walls 38 curve smoothly upwardly at their forward ends to assist the water skimmer boat in maintaining an even keel even though the scoop 52, when in the lowered position illustrated in FIGURE 2 of the drawings, has a tendency to pull the forward ends of the hull members 12 and 14 downwardly.

The pull members or tension members 118 not only provide a means whereby the scoop 52 may be raised and lowered at opposite ends, but also provide a means for pivotally supporting each end of the scoop 52 for rotation about a substantially horizontally disposed axis extending transversely of the water skimmer boat 10. Still further, when the forward end of the scoop 52 is lowered as viewed in FIGURE 2 of the drawings, the sole means of support for the scoop 52 from the hull members 12 and 14 comprises the tension members 118 and therefore, should the forward end of the scoop 52 strike a submerged object, the scoop 52 will be suspended in a swing-like fashion and may therefore yield under its impact with a submerged object independently of the hull members 12 and 14.

When it is desired to transport fish in the scoop 52 when the front wall 62 is in the lowered position illustrated in FIGURE 1 of the drawings, the fasteners 80 may be utilized to support the forward end of the scoop 52 between the hull members 12 and 14 in lieu of the tension members 118 supported from the forward winding drum 116.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A water skimmer boat comprising a pair of generally parallel elongated hull members, elongated transverse brace members interconnecting said hull members, and an elongated channel-shaped scoop extending longitudinally of said boat between said hull members including a pair of upstanding side walls interconnected by means of a foraminated bottom wall and closed at one end by means of an upstanding end wall, means pivotally supporting said one end of said scoop between the corresponding ends of said hull members for movement about a generally horizontally disposed transversely extending axis and swinging movement of the other end of said scoop, and means carried by said hull members and operatively connected to said other end of said scoop for maintaining said other end in vertically adjusted positions.

2. The combination of claim 1 wherein said means for maintaining said other end of said scoop in vertically adjusted positions includes means for raising and lowering said other end.

3. The combination of claim 1 wherein said means for maintaining said other end of said scoop in vertically adjusted positions includes means for raising and lowering said other end, the last-mentioned means further including means pivotally supporting said other end of said scoop for movement about a generally horizontally disposed transversely extending axis and including means for vertically adjusting the axis of rotation of said other end of said scoop.

4. The combination of claim 1 wherein said scoop includes a second end wall at the other end thereof pivotally supported from said side walls for movement between an upright position closing said other end of said scoop and a horizontally disposed inoperative position.

5. The combination of claim 4 wherein the first-mentioned end wall is also pivotally supported from its upper marginal edge portions.

6. The combination of claim 1 wherein said hull members each include steerable rudder means on its forward end.

7. The combination of claim 6 including means operatively interconnecting said steerable rudder means for equal and simultaneous operation.

8. The combination of claim 1 wherein said boat includes steerable rudder means on its forward end, and steering means at the rear end of said boat operable independently of said rudder means at the forward end thereof.

9. The combination of claim 1 wherein each of said hull members include means defining a plurality of sealed flotation compartments.

10. The combination of claim 1 including a transversely extending roller dependingly journaled from the forward end of said scoop.

11. The combination of claim 1 wherein said means pivotally supporting said one end of said scoop and said means carried by said hull members for maintaining said other end of said scoop in vertically adjusted positions include elongated upstanding tension members swingably supported from said hull members at their upper ends and secured to the corresponding ends of said scoop at their lower ends for swinging movement of said scoop relative to said hull members in fore and aft directions.

References Cited by the Examiner

UNITED STATES PATENTS

| 2,876,903 | 3/1959 | Lee | 210—242 |
| 2,989,185 | 6/1961 | Lombardi | 210—65 |
| 3,142,281 | 7/1964 | Muller | 114—.5 |

FOREIGN PATENTS 1,157,160  11/1963  Germany.

REUBEN FRIEDMAN, *Primary Examiner.*

C. DITLOW, *Assistant Examiner.*